(12) United States Patent
Wiseman

(10) Patent No.: US 12,470,368 B2
(45) Date of Patent: Nov. 11, 2025

(54) KEY DISTRIBUTION USING KEY DUPLICATION POLICIES

(71) Applicant: Beyond Identity, Inc., West Palm Beach, FL (US)

(72) Inventor: Willard M. Wiseman, Edmond, OK (US)

(73) Assignee: Beyond Identity Inc., West Palm Beach, FL (US)

( * ) Notice: Subject to any disclaimer, the term of this patent is extended or adjusted under 35 U.S.C. 154(b) by 233 days.

(21) Appl. No.: 18/211,241

(22) Filed: Jun. 17, 2023

(65) Prior Publication Data

US 2024/0421981 A1 Dec. 19, 2024

(51) Int. Cl.
*H04L 9/08* (2006.01)
*H04L 9/40* (2022.01)

(52) U.S. Cl.
CPC .......... *H04L 9/0825* (2013.01); *H04L 9/0897* (2013.01); *H04L 9/40* (2022.05)

(58) Field of Classification Search
CPC ........ H04L 9/0825; H04L 9/0897; H04L 9/40
See application file for complete search history.

(56) References Cited

U.S. PATENT DOCUMENTS

| | | | |
|---|---|---|---|
| 10,728,044 B1 | 7/2020 | Melo et al. | |
| 10,756,908 B1 | 8/2020 | Melo et al. | |
| 10,878,468 B2 | 12/2020 | Sasa | |
| 10,972,450 B1* | 4/2021 | Rao | H04L 63/08 |
| 2014/0359481 A1* | 12/2014 | Dawson | G06Q 10/10 715/753 |
| 2017/0262294 A1* | 9/2017 | Yakan | G06F 40/166 |
| 2017/0264559 A1* | 9/2017 | Lu | H04L 69/06 |
| 2018/0007119 A1* | 1/2018 | Das | H04L 67/568 |
| 2021/0286758 A1* | 9/2021 | Verma | G06F 21/57 |
| 2023/0110135 A1* | 4/2023 | Singh | G06K 7/1417 235/462.1 |
| 2023/0351034 A1* | 11/2023 | Parikh | H04L 67/06 |

OTHER PUBLICATIONS

"Trusted Platform Module Library Part 1: Architecture," Family "2.0", Level 00 Revision 01.59, TCG Published, Nov. 8, 2019, 306 pages.
"How FIDO Addresses a Full Range of Use Cases," FIDO Alliance, Mar. 2022, 9 pages.

* cited by examiner

*Primary Examiner* — Hany S. Gadalla
(74) *Attorney, Agent, or Firm* — Greenberg Traurig, LLP

(57) ABSTRACT

In embodiments, a method is provided for duplicating a user private key to multiple user devices so that websites and services don't need a separate public key for each user device. A Duplication Service is authorized by the user to cause the creation of the initial user private key in a user device. The Duplication Service associates the key's properties with a set of policies (e.g., using a TPM key template) that allow and restrict duplication. The process protects the user's private key from exposure to the Duplication Service with a user secret entered at a second user device to decrypt the duplicated key.

20 Claims, 8 Drawing Sheets

TPM TEMPLATE

KEY DISTRIBUTION USING KEY DUPLICATION POLICIES

BACKGROUND OF THE INVENTION

The present invention relates to duplicating keys for multiple user devices.

Cryptographic keys can be used to either augment or replace the use of passwords to authenticate a user. For each party (e.g., website, service) relying on the authentication ("Relying Party), the user has only one key pair. The Relying Party has a copy of the user's public key that is used to verify that the user possesses the private key. The user's private key is kept and protected in what is called an Authenticator. An Authenticator is a component either built into the user's smartphone, tablet or computer or is a portable device owned by the user and plugged into such devices, such as a dongle plugged into a USB port.

Users usually possess multiple devices that they use to log into Relying Parties, such as a smartphone, tablet, portable computer and desktop computer. When using passwords, the user can enter the same password (along with their username) with any of these user devices. This is possible because passwords are memorable, or easily copyable, enabling the user to repeat the authentication process for each of their devices. However, with keys or certificates signed by keys, a separate key is stored in the Authenticator of each user device. Thus, each service or Relying Party needs to store a different public key for each device of the same user. It would be desirable to be able to use the same private and public key for all of a user's devices.

The FIDO Alliance [https://fidoalliance.org/] is a Standards Development Organization that has defined standards for authentication using cryptographic keys. The current FIDO architecture describes a key (key pair) for a single Authenticator. This requires the user to establish a different key pair to prove their identity for each device. This also requires the Relying Party to keep track of each of the user's various public keys from each of the user's Authenticators.

The FIDO Alliance has described the desirability of syncable passkeys (also called a Multi-Device Credential). A syncable passkey would use a sync fabric to sync a FIDO credential's cryptographic key across multiple devices belonging to the same user. It would be desirable to have a mechanism to achieve this goal that provides desired security.

BRIEF SUMMARY OF THE INVENTION

In embodiments, a method for duplicating a user private key from a first user device to a second user device is provided. A duplication application is installed on the first user device. The user and a first user device are registered with a Duplication Service server. The user device is associated with a policy that allows duplication to additional user devices conditioned upon provision of the user secret. The Duplication Service server sends a blob with the policy to the duplication application on the first user device. The duplication application sends a create key command to an authenticator on the first user device. The user private key is created by the authenticator on the first user device. The Duplication Service server receives a duplication request and the user secret from the first user device. A duplication command is sent from the Duplication Service, through the duplication application, to the authenticator on the first user device. The user private key is encrypted in the authenticator on the first user device. The encrypted user private key is sent from the authenticator on the first user device, through the duplication application, to the Duplication Service server. The user private key is downloaded from the Duplication Service server to a second duplication application on a second user device. The encrypted user private key is sent to an authenticator on the second user device.

In embodiments, the blob conforms to a Trusted Platform Module (TPM) template. The authenticator is a trusted Platform Module (TPM). Embodiments of the present invention leverage the TPM, which is designed to duplicate a private key for an escrow service, and repurpose it to securely duplicate keys to TPMs on other user devices.

In embodiments, the user private key sent to the Duplication Service is protected with a user secret unknown to the Duplication Service. The user secret is received from the user at the second user device for decrypting the user private key.

In embodiments, the policy includes a public key corresponding to a private key of the Duplication Service and a provision for a user secret to encrypt the user private key. An audit file is maintained with a log of commands and parameters involved in duplication of the user private key. The Duplication Service server creates and maintains the policy for the user that restricts the duplication of the user private key to destination user devices provided by the user.

In embodiments, the authenticators are verified on the first and second user devices to be authorized by the user and a relying party. A list of approved authenticators is maintained at the Duplication Service server. In one embodiment, the relying party is verified using an existing login to the relying party.

DETAILED DESCRIPTION OF THE INVENTION

Problem

Figure 1:
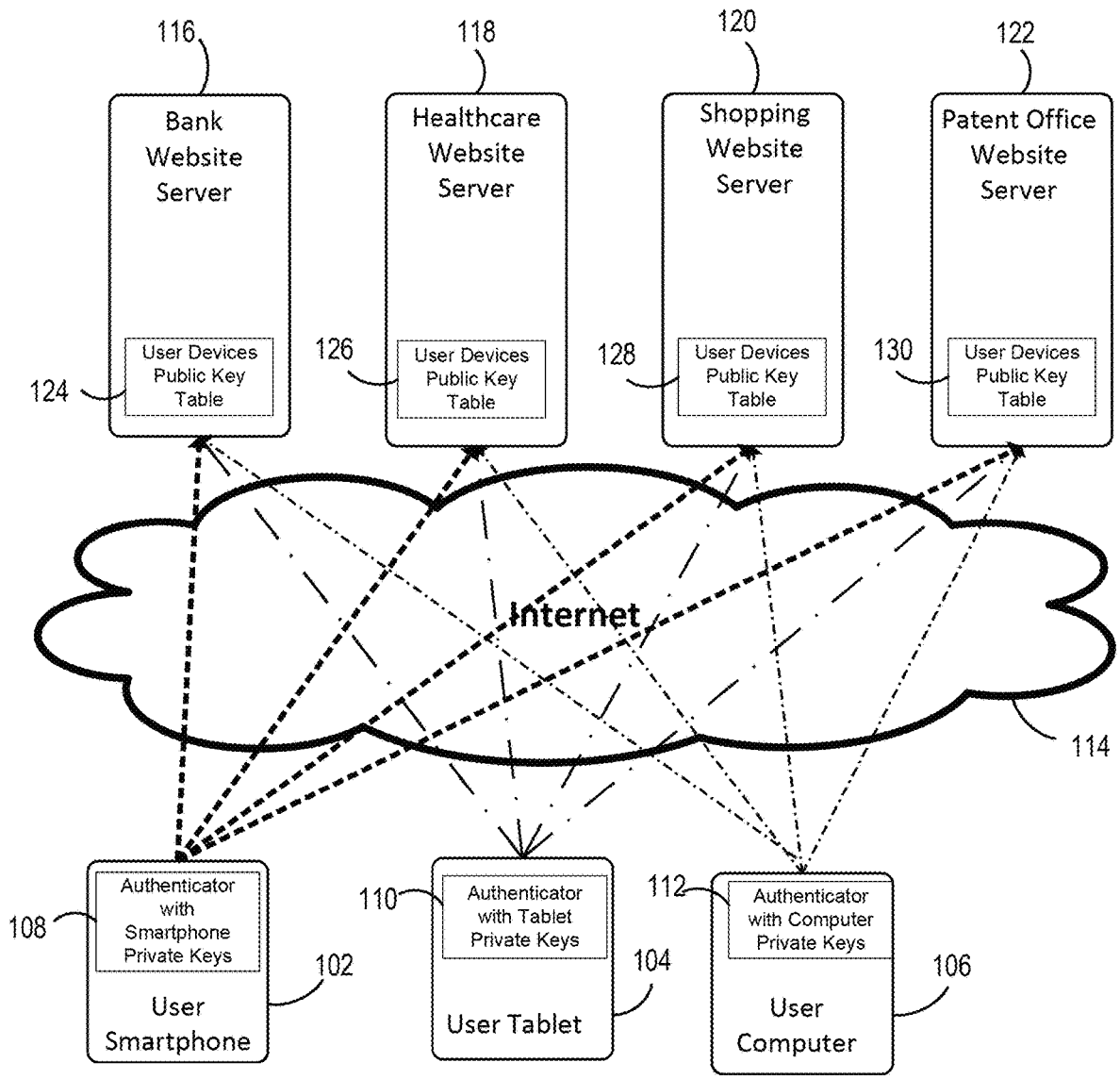
FIG. 1 is a diagram illustrating the current prior art use of separate private keys for each user device.

FIG. 1 is a diagram illustrating the current prior art use of separate private keys for each user device. A user has multiple user devices—a smartphone 102, tablet 104 and computer 106. Each device has its own Authenticator, with separate private keys. Smartphone 102 has an authenticator 108 with smartphone private keys, tablet 104 has an authenticator 110 with tablet private keys, and computer 106 has an Authenticator 112 with computer private keys. Each of these devices can communicate over the internet 114 to various services and Relying Parties, such as a bank website server 116, a Healthcare website server 118, a shopping website server 120 and the Patent Office website server 122. Each of these servers stores a table with public keys corresponding to private keys for each user device. Each table is different, because, for example, the user will have a first smartphone private key for Bankwebsite server 116, a second private key for Healthcare website server 118, a third private key for shopping website server 120, and a fourth private key for Patent Office website server 122. Similarly, each of user tablet 104 and user computer 106 will have separate tablet and computer private keys, respectively, for each RelyingParty server. Shown are user device public key tables 124, 126, 128 and 130. As can be seen, each Relying Party server must store multiple public keys for each user. This not only takes up more space, it complicates the management of the keys and requires a procedure to establish the public key for each new user device.

Certificate

Figure 2:
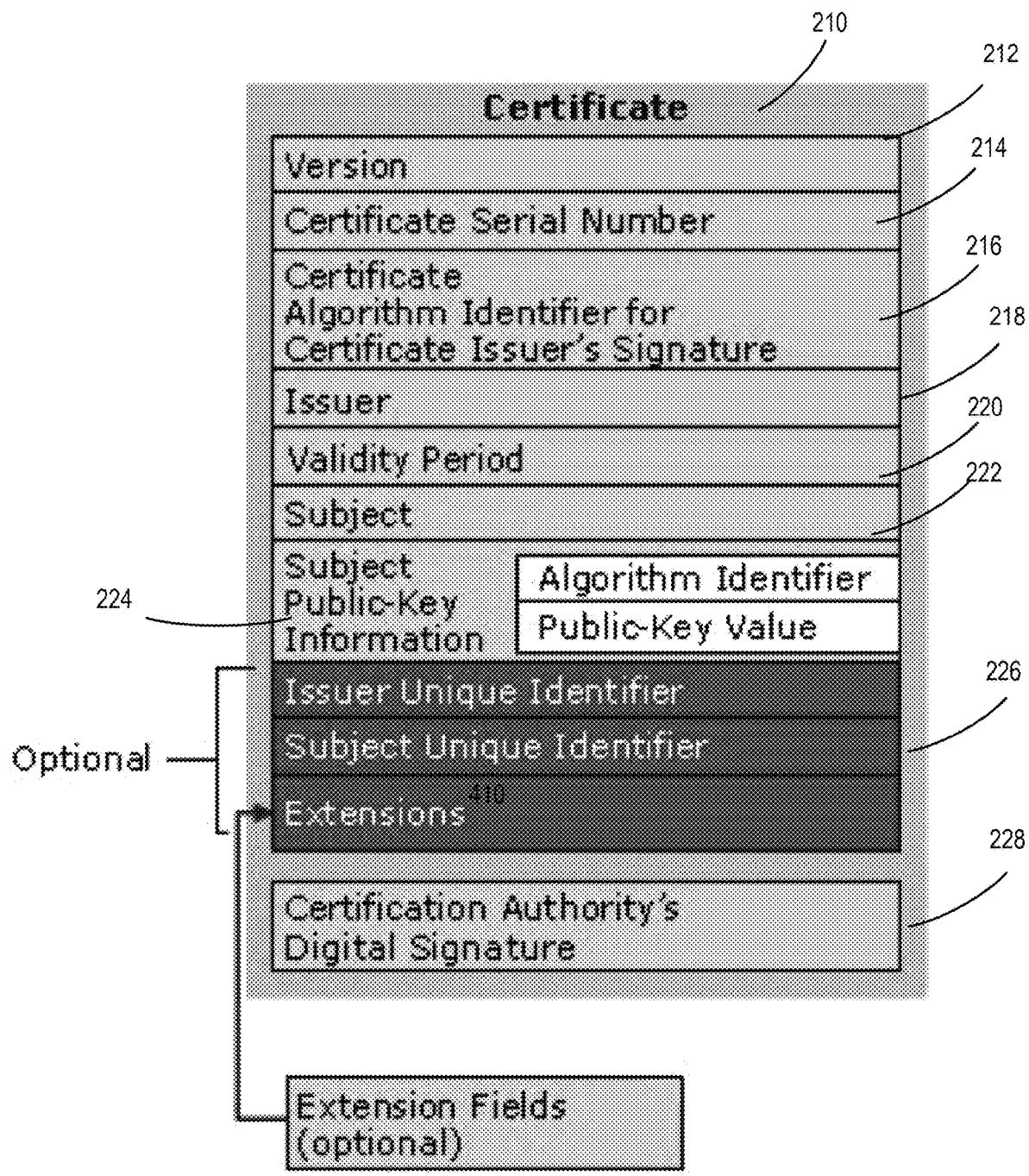
FIG. 2 is a diagram of a prior art standard certificate signed by a user's private key.

FIG. 2 is a diagram of a prior art standard X.509 certificate signed by a user's private key. An X.509 certificate is one way to store a duplicated public key. Alternately, JSON or JWT formats could be used. Alternately, the bare key or a key credential could be stored. When a certificate is used, the Relying Parties use the public key pair to decrypt and obtain encrypted data. Certificate 210 contains a version field 212, a certificate serial number 214, and a Certificate algorithm identifier field 216 (describing how the certificate contents were hashed, and the algorithm used to sign the hash). An issuer field 218 would normally have a copy of the subject field of the certificate that signed.

Field 220 is a validity period, which would set forth the expiration date of the certificate. This may be set to a very long period (e.g., until the year 9999), so a user is not faced with the hassle of creating a new certificate. A subject field 222 (which is an X.509 would be either the SubjectName or SubjectAlternateName) will identify the user but could in addition describe a company, with its location, phone number, address, email, etc.

Field 224 contains the public key information, with an algorithm identifier and a public-key value. This will be a different public key for each certificate. Optional and extension fields 226 can include a variety of data, including identifying whether the certificate is an intermediate certificate or a leaf certificate in a string of certificates. Field 228 includes the Certification Authority's Digital Signature.

Overview

The present invention leverages a trusted processor hardware module designed to duplicate a private key for an escrow service, and repurposes it to securely duplicate keys to trusted processor hardware modules (Authenticators) on other user devices. In certain device architectures (e.g., Intel and AMD), the hardware module is the Trusted Platform Module (TPM), which will be described herein as an example embodiment. The TPM can be part of the processor or a discrete component. Other processors will have other secure hardware modules.

Embodiments provide a method to prove the Authenticator is authorized by the user and the Relying Party prior to creating the initial user private key. Also provided is a method for the Duplication Service to associate the key's properties with a set of policies (e.g., using the TPM's key template). A specific method to protect the user's private key from exposure to the Duplication Service is provided. Also, a specific method allows the user to authorize copying their private key to a new Authenticator.

Figure 3:
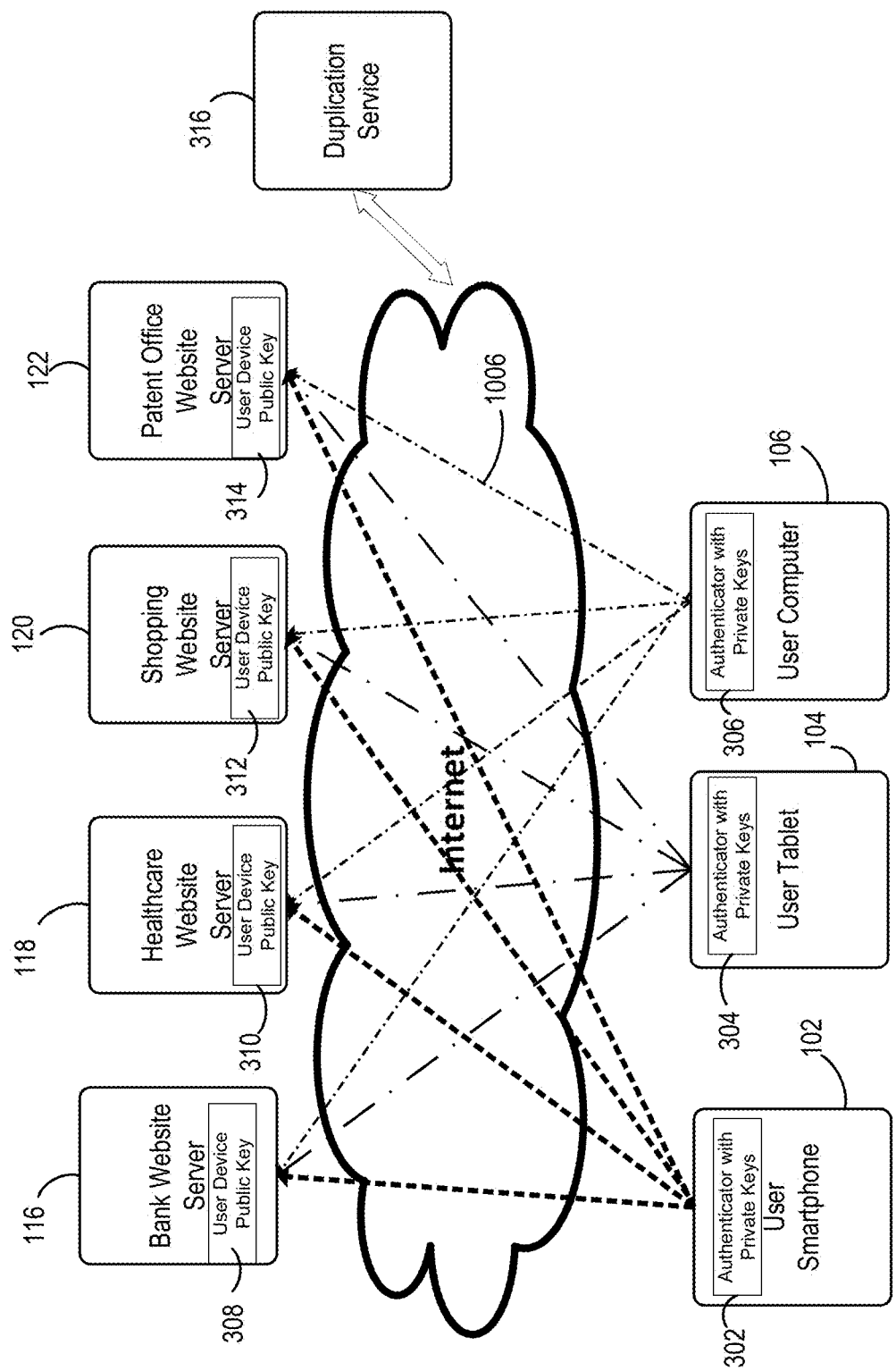
FIG. 3 is a diagram illustrating the use of the same private key on multiple user devices, according to embodiments.

FIG. 3 is a diagram illustrating the use of the same private key on multiple user devices, according to embodiments. The user's private keys are duplicated and provided to each of the user's device(s). Smartphone 102 has Authenticator 302 with user private keys for each Relying Party service. User tablet 104 will have the same private keys duplicated to its Authenticator 304. User computer 106 will also have the same private keys duplicated to its Authenticator 306. As a result, Bank Website server 116 will have just a single user public key 308 corresponding the same private key of the user. Similarly, website servers 118, 120 and 122 will each have their own, single public key 310, 312 and 314, corresponding to a single user private key for that website.

A Duplication Service 316 is used to facilitate the duplication of the user private key for each website or service (Relying Party). The Duplication Service 316 is an entity trusted by the Relying Parties and users. The keys are copied only from and to Authenticators trusted by the user and the Relying Party (e.g., website servers). The Duplication Service maintains a list of user and Duplication Service authorized Authenticators and verifies the Authenticator. The Duplication Service maintains a policy that restricts the destination Authenticators (additional user devices) to those allowed by the policy. The policy includes two secrets. The first secret is the Duplication Service private duplication keys (the public portion is given to the Duplication Application). The second secret is a user secret known only to the user and is not shared. It is used to protect the user's key from the Duplication Service. In one embodiment, the user secret is a sequence of bits, typically 256 bits. The user secret is known only to the user and is not shared. It can be a password or passphrase known only to the user then hashed to produce the sequence of bits. It may also be a random number stored in a user protected file or other device.

In embodiments, an audit trail is maintained by the Duplication service. An audit is created by using a TPM audit session which is a special type of session during communication with the TPM. In this type of session, the TPM keeps a log of all commands and relevant parameters. In the embodiments of this invention, the commands are those involved in duplication. At the conclusion of the TPM command session, a key within the TPM signs a digest of the session. This signed digest is stored. If an Authenticator is compromised, or simply on a device that is not trusted, the audit trail will show which keys were copied to the compromised Authenticator so those keys can be revoked. Perhaps as important, keys that have not been copied to the compromised Authenticator can be identified so those keys do not need to be revoked (revoking keys is often an expensive and disruptive event). For example, some Relying Parties or services may not trust private keys in an Authenticator on a smartphone that has certain suspect applications on it.

In embodiments, the Duplication service can be an identity management company, an OS vendor's service such as Windows or MacO, or a browser company (e.g., Google). In one embodiment, the Duplication service can implement the sync fabric described by FIDO.

Summary of Duplication Process

In embodiments, the Duplication service determines that the source and destination Authenticators are authorized by both the Relying Party and the User. There are a number of ways to perform this. One option is to assume an existing login provides proof the device is authorized. Another method is to authenticate the device using supply chain assurance keys already provisioned. In this option, the Relying Party has a database of authorized devices and can use device keys to authenticate the device. The authorized Authenticators are indicated by a policy for the user, which the user approves and the Duplication Service stores. The key is protected as it is copied from the source Authenticator to an authorized destination Authenticator by encrypting it using the Duplication Service Public key. The user key is also protected from exposure to the Duplication Service by optionally adding a user secret that is used as a symmetric key. When the duplication command is received at the second user device, the user can input the user secret. Thus, the Duplication Service never sees the user private key, even though the user private key is sent to the second user device through the Duplication Service.

In embodiments, the Relying Parties (e.g., application services) rely on the association between the user and the key to authenticate the user. The Duplication service determines this association in a manner satisfactory to the Relying Parties. For example, the Duplication Service confirms the association by "Identity Proofing"—having some proof that the human is associated with the key being duplicated. There are many ways to do this known to those of skill in the art. This association is assumed to have been performed.

In embodiments, a hardware module in a user device processor is the Authenticator, such as, for example, a Trusted Platform Module (TPM). The TPM provides a wide range of attributes and policies required to access keys. Among these attributes and policies is the ability to duplicate a key for an escrow for key recovery or duplication. A key's attributes and policies are part of the key's creation and cannot be changed for the life of the key in one embodiment. There is a policy that allows a policy to be changed, but it is not used in this embodiment. In particular, for key duplication, the following attributes and policies are leveraged. (1) A specific key attribute allows the key duplication. (2) A specific key attribute requires (or not) that the key's private component be encrypted during duplication. (3) A policy may restrict the destination of the key.

In embodiments, the TPM is used as follows. The TPM2_Duplicate command is issued. In one embodiment, the command is issued by a standalone application on the user device in coordination with an independent service communicating with both devices (e.g., the Duplication Service). This standalone application provides the destination device public key (ds-parent's public key—see 702 in FIG. 7 discussed below) in a Destination Blob to the destination device. The encrypted key is sent to the destination device. At the destination device application the Duplication Blob is received and sent to the TPM using the TPM2_Import command. The standalone application, in embodiments, is downloaded by an identity management company, an OS vendor as part of their services (i.e., bundled app) such as Windows or macOS, or as part of the browser's binary package. The key is now duplicated into the destination device's TPM. Additional details of the TPM duplication process are described in TCG TPM2 Part 1 Architecture [1] section 23.3 Duplication.

Embodiments of the invention thus provide for the use of the methods described in the TPM Part 1 Architecture to support duplicating a user's key to several of the user's Authenticators with the enforcement of policies established by the Duplication Service.

Key Duplication

Figure 4:
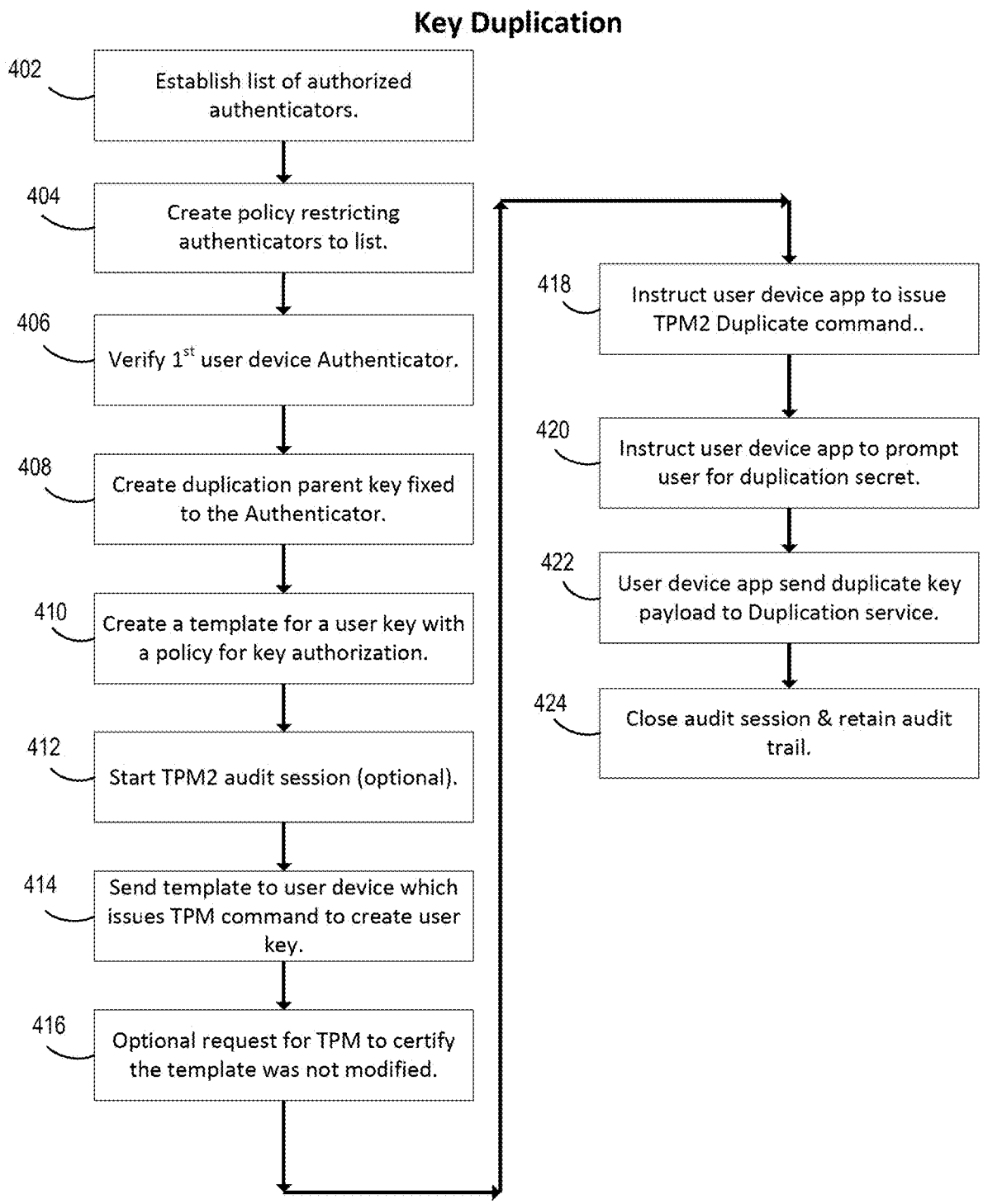
FIG. 4 is a flowchart illustrating an embodiment of the duplication process.

FIG. 4 is a flowchart illustrating an embodiment of the key duplication process.

In step 402, the Duplication Service establishes a list of user and Duplication Service authorized Authenticators. This can be done a variety of ways. In one embodiment, the user establishes an account with the Duplication Service using one of the user devices, entering a user name, password, email address, phone number, etc. The user device provides a device key uniquely identifying the device. The user then logs in separately from the other user devices, using the user name and password, and potentially two-factor authentication with a code sent to the user's email or phone number. The authenticators on these user devices are then added to a list of authorized authenticators for the user. The Duplication Service authorized Authenticators are established in one of a number of ways as described above. One option is to assume an existing login provides proof the device is authorized. Another method is to authenticate the device using supply chain assurance keys already provisioned. In this option, the Relying Party has a database of authorized devices and can use device keys to authenticate the device. The authorized Authenticators are indicated by a policy for the user, which the user approves and the Duplication Service stores.

In step 404, the Duplication Service creates and maintains a policy for the user that restricts the destination Authenticators to those provided by the user. Various options for creating and maintaining the list of destination Authenticators can be provided by those of skill in the art, such as providing destination Authenticators created by the Duplication Service for the user.

In step 406, the Duplication Service Verifies the first Authenticator. This can be done a variety of ways. The Duplication Service policy may state that the user device already has another key that is trusted. For example, a user may already have a device resident key (not sinkable) that the Duplication Service already trusts. In this case, the Duplication service assumes, since the already present device resident, non-syncable key is not movable, that the device is that user's device (by assuming whoever provided that key is trusted). Another method is to use methods such as Device Attestation where another TPM key (called an Attestation Key or AK) is created prior to this step and can authenticate the TPM.

In step 408, the Duplication Service creates a Duplication Parent key with the attribute that it is not permitted itself to be duplicated—it is fixed to that Authenticator. Thus, the Duplication Parent key cannot be copied to another device.

In step 410, using the policy created in step 404 for the user, the Duplication Service creates a template for a User key. The template includes either a known destination Authenticator on an existing device or a Destination Service ds-parent. At a minimum, the first device encrypts the user key with the ds-parent's public key. If a Destination Service ds-parent, this Authenticator will perform a "Rewrap" function for new user Authenticators. The "Rewrap" function is a primitive of an exemplar key recovery service that performs all its security-sensitive processes on TPMs. While designed for key recovery, embodiments of the present invention use the rewrap function to facilitate a key duplication and provision of the duplicated key to another user device. The key's template has a policy which includes (e.g., using a Policy AND) the use of a secret known only to the Duplication Service The "secret" in this case is the ds-parent's private key. The first secret is the ds-parent private key which is the "outer" layer encryption. There is an optional "inner" layer that is encrypted using a secret known only to the user. This prevents the DS from knowing or sending the key to authenticators that are not authorized by the user. This is discussed further below. The secret policy is established by setting the key's authPolicy. The setting can be done using either the TPM PolicySecret or PolicySigned functions. This prevents the user or any other agent other than the Duplication Service from copying the key. In other embodiments, other policies can be established to provide additional security. For example, PolicyPCR can be used, which requires booting to a dedicated key copy ceremony. In addition, PolicyCounterTimer can be used, which allows the copy to be made only a certain number of times or within a certain timeframe.

In step 412, the Duplication service optionally starts an TPM2 Audit Session. An audit session collects a digest of command/response parameters to provide proof that a certain sequence of events occurred. Thus, the audit session can be used to track duplications of the user key, in particular the devices to which it is duplicated and characteristics of those devices.

In step 414, the Duplication service sends the template to the standalone application running on the User's computer. The standalone application issues a TPM command to create the User's key using the template provided by the Duplication Service.

In step 416 (optional), the Duplication Service may request the application perform a TPM "Certify." Certify is an operation that provides additional proof that the key was created using the template (i.e., it was not modified). In one embodiment, Certify may be used instead of an Audit or in addition to the Audit.

In step 418, the Duplication Service causes the standalone application on the user device to issue a TPM2_Duplicate command.

In step 420, the standalone application on the user device prompts the user for a "duplication secret." The duplication secret is not known to the Duplication Service and is used to prevent the Duplication Service from obtaining the User's private key. It is also used by the User to authenticate the copy of the key to a new Authenticator.

In step 422, the standalone application on the user device sends the returned payload of the TPM2_Duplicate command to the Duplication service.

In step 424, the Duplication Service closes the TPM2 Audit session and retains the audit proving the command and its parameters were issued. This step is required if the optional Audit session of step 412 was started.

Key Import to Second User Device

Figure 5:
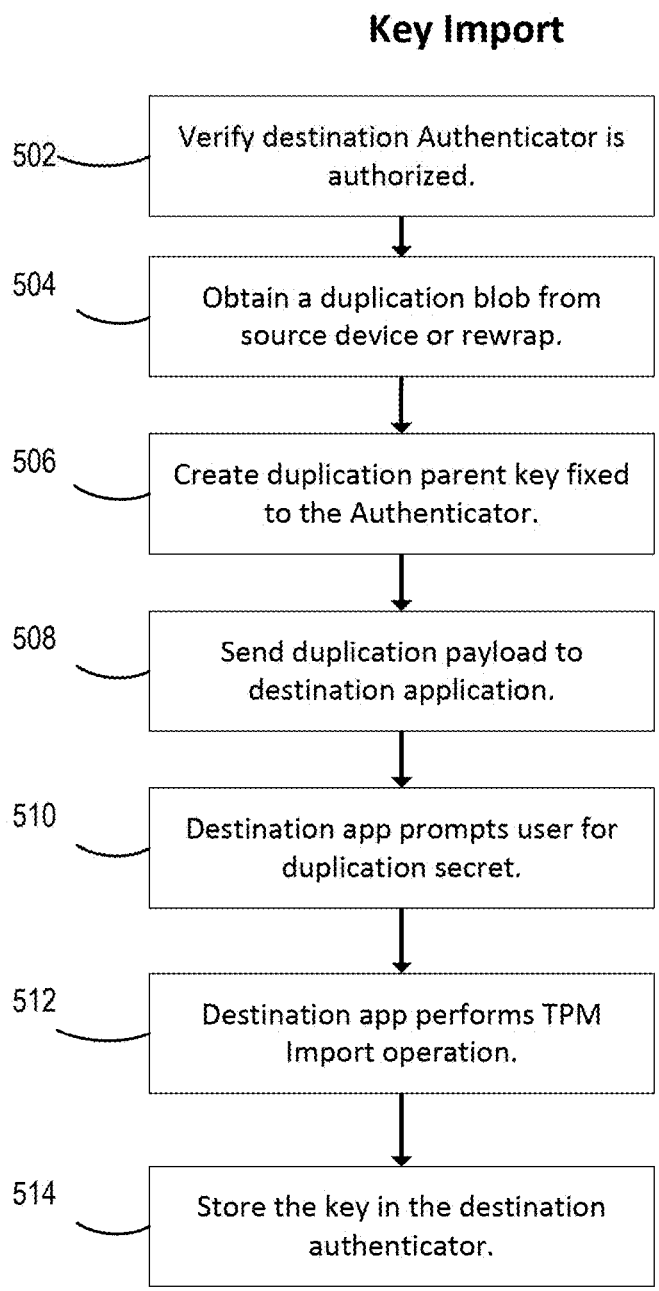
FIG. 5 is a flowchart illustrating an embodiment of the key import process to a second user device.

FIG. 5 is a flowchart illustrating an embodiment of the key import process to a second user device. This is used when a second Authenticator on a second user device needs a copy of the User's Key.

In step 502, the Duplication Service verifies the destination Authenticator is Authorized. This is done by comparing the destination Authenticator to the list of authorized authenticators established in step 402 above. The Duplication Service may also check other attributes, such as if the computer is in a certain policy-required condition. Examples of the policy required conditions include whether the firewall turned on and whether the proper MDM (Mobile Device Management) installed. Other conditions may include whether other security features are in place or that applications that present risks are not present.

In step 504, the Duplication Service obtains a Duplication blob by either: (a) obtaining a new one from the source Authenticator (if it is available) starting from step 416 above, or (b) performing a "Rewrap" on a stored Duplication blob with the destination Authenticator as the destination. Steps 502-504 may be performed within a TPM Audit session as proof of the operations and the parameters.

In step 506, the Duplication Service creates a Duplication Parent key with the attribute that it is not permitted itself to be duplicated—it is fixed to that Authenticator. The destination's duplication parent key may already be present. It may have been created by previous processes like this one. If a user has multiple keys (for example, for different Relying Parties) the same Duplication Parent may be use for any or all.

In step 508, the Duplication Service sends the Duplication payload to the destination standalone application on the destination user device.

In step 510, the application on the destination user device prompts the user for the duplication secret.

In step 512, the application on the destination device performs a TPM Import operation.

In step 514, the key is stored in the destination Authenticator. As described in the TPM 2 Specification Part 1, the destination Authenticator may be either an existing authorized User's Authenticator or may be "Rewrap: Authenticator managed by the Duplication Service." This will allow the User's key to be copied to an arbitrary number of authorized Authenticators.

TPM Template

Figure 6:
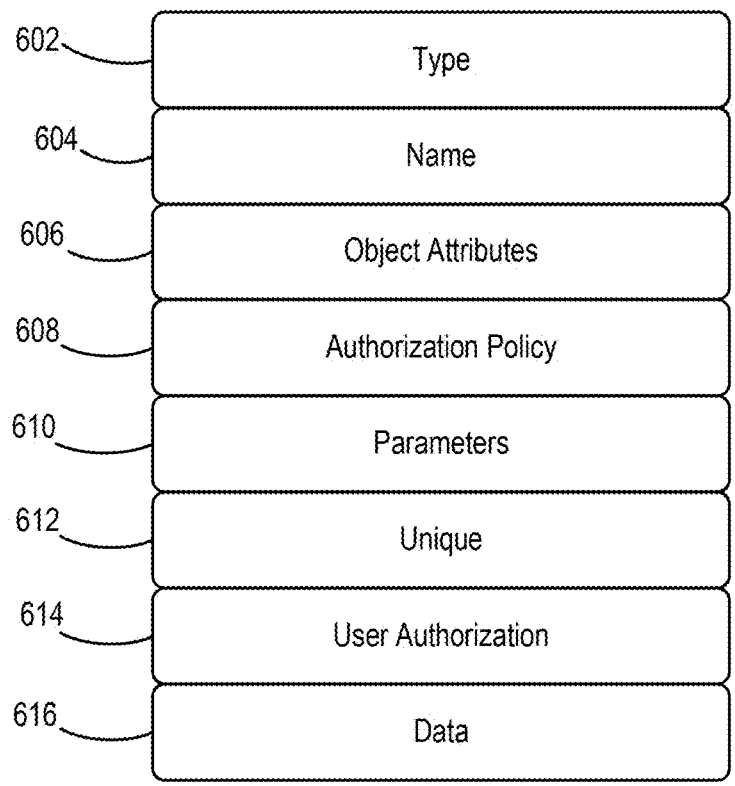
FIG. 6 is a diagram illustrating the fields of a TPM template, according to embodiments.

FIG. 6 is a diagram illustrating the fields of a TPM template, according to embodiments.

Type field 602 indicates the basic type of the object and determines the format of the parameters and unique fields. The type may indicate a symmetric key, an asymmetric key, or a data value.

Name field 604 is set according to the object type. If the object is a restricted-decryption key, then the object is required to have the same name as the Storage Parent. For all other cases, the name may be any supported hash algorithm.

Object Attributes field 606 are flags set according to the rules appropriate for loading the object.

Authorization Policy field 608 is used where an object is to be gated by a policy (including PCR), in which case this template field will contain the policy hash.

Parameters field 610 contains parameters that describe the details of the object indicated in the type field.

Unique field 612 is replaced by the TPM during the object creation process. The caller may place any value in this field as long as the structure of the value is consistent with the type field.

User Authorization field 614 is the initial authValue for the created object. This value may be no larger than the digest produced by the name of the object. The user key may use authValue or authPolicy (set by the bit "userWithAuth" attribute).

Data field 616 contains information that the caller wants to be incorporated in the sensitive part of the created object. This may be either a symmetric key or user data.

Duplication System

Figure 7:
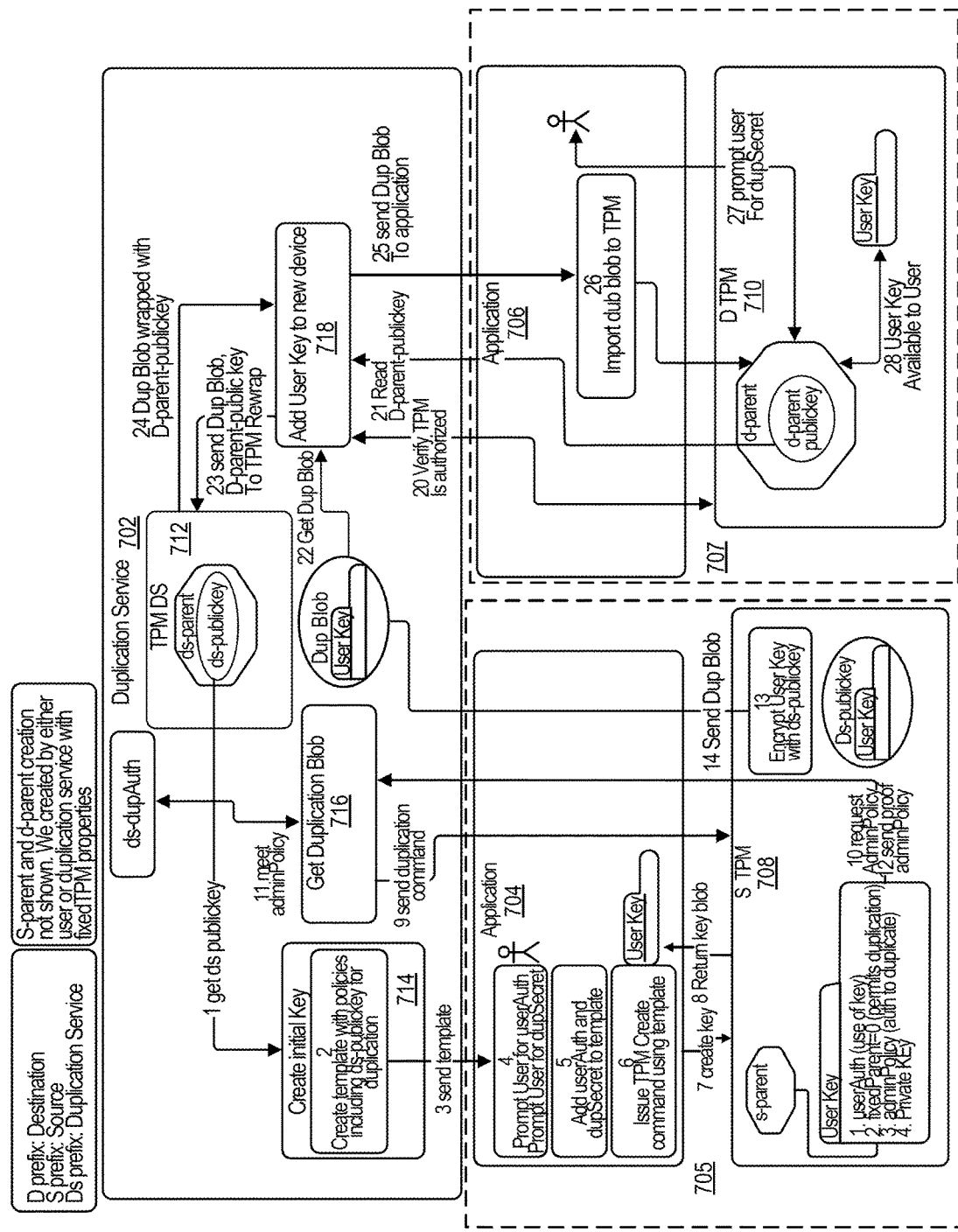
FIG. 7 is a diagram illustrating the duplication system, according to embodiments.

FIG. 7 is a diagram illustrating the duplication system, according to embodiments. A Duplication Service 702 communicates over the Internet or another network with an application 704 on a first user device 705. Application 704 in turn communicates with a Source TPM (S TPM) hardware module 708 in the processor of the first user device 705. Duplication Service 702 also communicates over the Internet or another network with an application 706 on a second user device 707, which the user desires to have a duplicate key. Application 706 in turn communicates with a Destination TPM (D TPM) hardware module 710 in the processor of the second user device 707.

An embodiment of the steps of a duplication process are illustrated in FIG. 7. A user registers a first user device 705 with Duplication Service 702 and initiates a process 714 to create an initial key. A Duplication Service processor hardware TPM (TPM DS) 712 then creates and holds a public key. In step 1, the public key is obtained. A TPM template is created with policies that include allowing the use of the DS public key for duplication (step 2). The TPM template with the policy key is sent to application 704 on user device 705. Application 704 prompts the user for a duplication secret (step 4). After receiving and verifying the user secret, a user authorization is added to field 614 of the TPM template (step 5). A TPM Create command is then issued using the template (step 6). There are two commands that can be used: TPM2_Create and TPM2_CreateLoaded. Both can be considered TPM Create commands. The create key command is then sent to TPM module 708 (step 7). The private key is created by TPM module 708 and put in the data field 616 (FIG. 6) of the key blob. A key blob is returned (step 8).

When the user desires to duplicate a key (or a set of keys) to a second user device, the user logs onto the Duplication Service from the first user device 705 and initiates a duplication process 716. A Get Duplication Blob command is issued. The duplication command is sent, to the application 704, which forwards it to S TPM 708 (step 9). S TPM 708 requests an adminPolicy (step 10) from the Duplication Service 702. The adminPolicy initiates (with the help of the Application) one or more required steps to meet the adminPolicy. For example, if adminPolicy required TPM2 PolicySigned, then the TPM (through the Application) will issue a challenge that must be signed in order for the TPM2_Duplicate command to succeed. In step 11, the adminPolicy is met. In step 12, TPM 708 sends the proofs that it meets the adminPolicy to application 704. The policy is stored in field 608 of the TPM template shown in FIG. 6. The user private key is encrypted with the DS-parent public key by Source TPM 708 (step 13) and is sent to the Duplication Service as a duplication blob (step 14).

After the Duplication Blob is obtained by Destination Service 702, a process 718 is initiated to add the user key to the new device. This involves first verifying that the TPM in the new device is authorized (step 20). This verification may, depending on the policy establish, verify that the second user device firewall is turned on, the proper MDM (Mobile Device Management) is installed, or other security features are in place or that applications that present risks are not present, etc. Some of these requirements may be established by the Relying Party. The destination device public key is read (step 21) and the duplication blob is obtained (step 22). The duplication blob and ds-parent public key are sent to the DS TPM 712 for a rewrap operation (step 23). The rewrapped duplication blob with the destination public key is returned (step 24) and sent to application 706 on destination user device 707 (step 25). Application 706 issues a TPM import command to D TPM 710 (step 26). The user is prompted on the destination device for the user duplication secret (step 27). The new user key then is stored in D TPM 710 and is available for use (step 28).

In one embodiment, the user has a large number of different private user keys for different Relying Parties and services. The duplication process described above can duplicate all of them at the same time to the second user device.
Audit All TPM commands are sent using a Session. A session provides context of the commands between the TPM and the application. A session may have one or more TPM commands. Normally, when the session is closed evidence of the parameters sent and received are lost. A session may be created that provides evidence of the parameters. When this type of session is used, the TPM keeps track of the parameters for commands executed within that session. When the session is closed, the digest of the parameters is signed by a key within the TPM. This provides a signed auditDigest which can be used to prove what command and which parameters for those command were done.

Computer Systems for Media Platform and Client System

As used herein, the term "website server" or "website" can alternately be any other computer to which a connection is desired, or an application on or off a user device, not just website computers. For example, it could be a database accessed without an associated website. Also, the Internet as shown can instead be a WAN or LAN or any other network. Accordingly, although a website server is used herein as an example, it should be understood that the present invention is more broadly applicable to any communication between processing devices.

Figure 8:
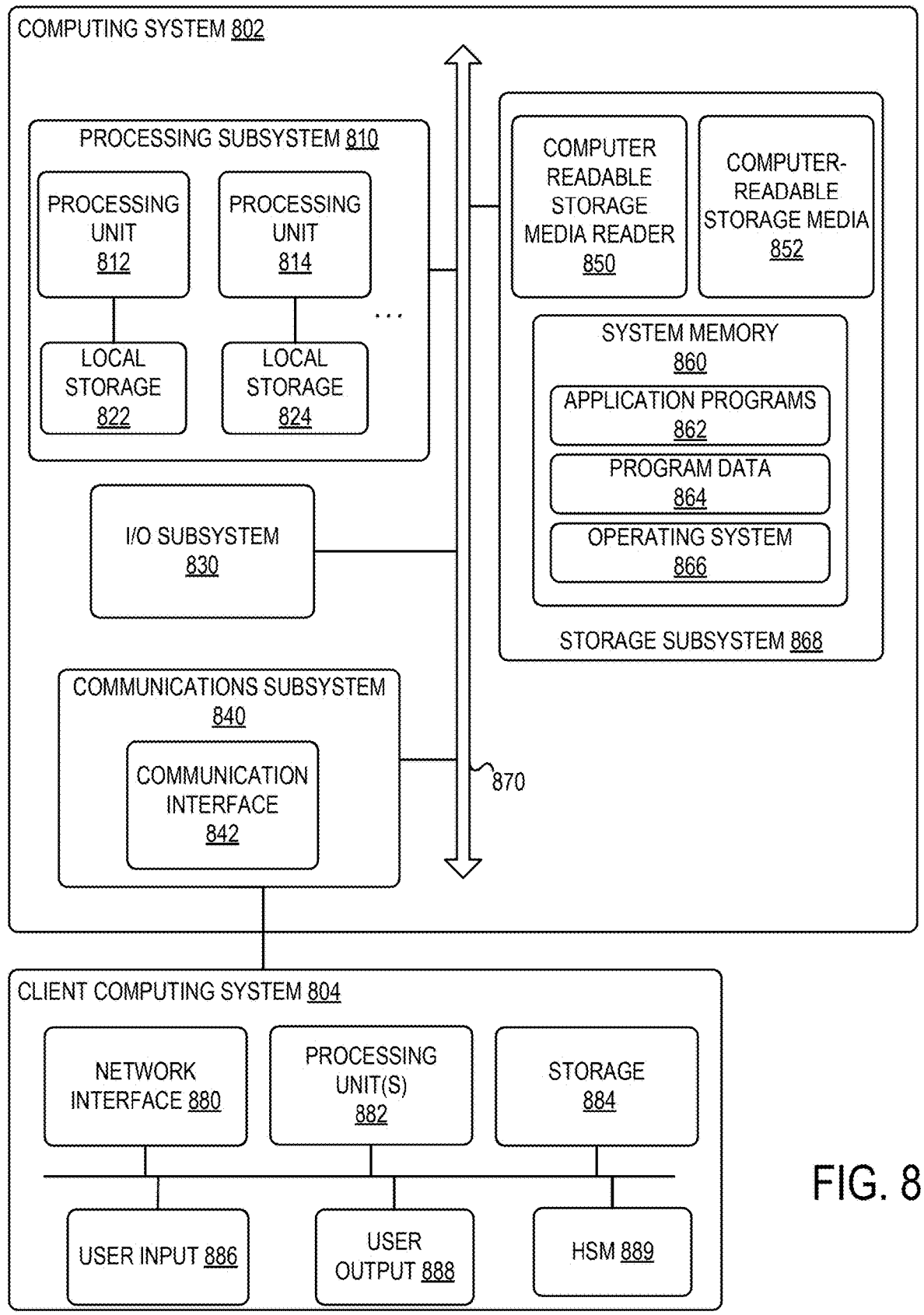
FIG. 8 is a simplified block diagram of a representative computing system usable to implement certain embodiments of the present invention.

Various operations described herein may be implemented on computer systems. FIG. 8 shows a simplified block diagram of a representative computing system 802 and client computing system 804 usable to implement certain embodiments of the present invention. In various embodiments, computing system 802 or similar systems may implement the server or website computing system or other verifying party, or any other computing system described herein or portions thereof. Client computing system 804 or similar systems may implement user devices such as a smartphone, tablet, computer, smart watch, or other devices.

Computing system 802 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 802 may include processing subsystem 810. Processing subsystem 810 may communicate with a number of peripheral systems via bus subsystem 770. These peripheral systems may include I/O subsystem 830, storage subsystem 868, and communications subsystem 840.

Bus subsystem 770 provides a mechanism for letting the various components and subsystems of server computing system 804 communicate with each other as intended. Although bus subsystem 770 is shown schematically as a single bus, alternative embodiments of the bus subsystem may utilize multiple buses. Bus subsystem 770 may form a local area network that supports communication in processing subsystem 810 and other components of server computing system 802. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 830 may include devices and mechanisms for inputting information to computing system 802 and/or for outputting information from or via computing system 802. In general, use of the term "input device" is intended to include all possible types of devices and mechanisms for inputting information to computing system 802. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 802 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 810 controls the operation of computing system 802 and may comprise one or more processing units 812, 814, etc. A processing unit may include one or more processors, including single core processor or multicore processors, one or more cores of processors, or combinations thereof. In some embodiments, processing subsystem 810 may include one or more special purpose co-processors such as graphics processors, digital signal processors (DSPs), or the like. In some embodiments, some or all of the processing units of processing subsystem 810 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 822, 824. Any type of processors in any combination may be included in processing unit(s) 812, 814.

In some embodiments, processing subsystem 810 may be implemented in a modular design that incorporates any number of modules (e.g., blades in a blade server implementation). Each module may include processing unit(s) and local storage. For example, processing subsystem 810 may include processing unit 812 and corresponding local storage 822, and processing unit 814 and corresponding local storage 824.

Local storage 822, 824 may include volatile storage media (e.g., conventional DRAM, SRAM, SDRAM, or the like) and/or nonvolatile storage media (e.g., magnetic or optical disk, flash memory, or the like). Storage media incorporated in local storage 822, 824 may be fixed, removable or upgradeable as desired. Local storage 822, 824 may be physically or logically divided into various subunits such as a system memory, a ROM, and a permanent storage device. The system memory may be a read and write memory device or a volatile read and write memory, such as dynamic random-access memory. The system memory may store some or all of the instructions and data that processing unit(s) 812, 814 need at runtime. The ROM may store static data and instructions that are needed by processing unit(s) 812, 814. The permanent storage device may be a nonvolatile read and write memory device that may store instructions and data even when a module including one or more processing units 812, 814 and local storage 822, 824 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 822, 824 may store one or more software programs to be executed by processing unit(s) 812, 814, such as an operating system and/or programs implementing various server functions such as functions of UPP system 102, or any other server(s) associated with UPP system 102. "Software" refers generally to sequences of instructions that, when executed by processing unit(s) 812, 814 cause computing system 802 (or portions thereof) to perform various operations, thus defining one or more specific machine implementations that execute and perform the operations of the software programs. The instructions may be stored as firmware residing in read only memory and/or program code stored in nonvolatile storage media that may be read into volatile working memory for execution by processing unit(s) 812, 814. In some embodiments the instructions may be stored by storage subsystem 868 (e.g., computer readable storage media). In various embodiments, the processing units may execute a variety of programs or code instructions and may maintain multiple concurrently executing programs or processes. At any given time, some or all of the program code to be executed may be resident in local storage 822, 824 and/or in storage subsystem including potentially on one or more storage devices. Software may be implemented as a single program or a collection of separate programs or program modules that interact as desired. From local storage 822, 824 (or nonlocal storage described below), processing unit(s) 812, 814 may retrieve program instructions to execute and data to process in order to execute various operations described above.

Storage subsystem 868 provides a repository or data store for storing information that is used by computing system 802. Storage subsystem 868 provides a tangible non-transitory computer-readable storage medium for storing the basic programming and data constructs that provide the functionality of some embodiments. Software (programs, code modules, instructions) that when executed by processing subsystem 810 provide the functionality described above may be stored in storage subsystem 868. The software may be executed by one or more processing units of processing subsystem 810. Storage subsystem 868 may also provide a repository for storing data used in accordance with the present invention.

Storage subsystem 868 may include one or more non-transitory memory devices, including volatile and non-volatile memory devices. As shown in FIG. 8, storage subsystem 868 includes a system memory 860 and a computer-readable storage media 852. System memory 860 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 802, such as during start-up, may typically be stored in the ROM. The RAM typically contains data and/or program modules that are presently being operated and executed by processing subsystem 810. In some implementations, system memory 860 may include multiple different types of memory, such as static random-access memory (SRAM) or dynamic random-access memory (DRAM). Storage subsystem 868 may be based on magnetic, optical, semiconductor, or other data storage media. Direct attached storage, storage area networks, network attached storage, and the like may be used. Any data stores or other collections of data described herein as being produced, consumed, or maintained by a service or server may be stored in storage subsystem 868.

By way of example, and not limitation, as depicted in FIG. 8, system memory 860 may store application programs 862, which may include client applications, Web browsers, mid-tier applications, relational database management systems (RDBMS), etc., program data 864, and one or more operating systems 866. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 852 may store programming and data constructs that provide the functionality of some embodiments. Software (programs, code modules, instructions) that when executed by processing subsystem 810 a processor provide the functionality described above may be stored in storage subsystem 868. By way of example, computer-readable storage media 852 may include non-volatile memory such as a hard disk drive, a magnetic disk drive, an optical disk drive such as a CD ROM, DVD, a Blu-Ray® disk, or other optical media. Computer-readable storage media 852 may include, but is not limited to, Zip® drives, flash memory cards, universal serial bus (USB) flash drives, secure digital (SD) cards, DVD disks, digital video tape, and the like. Computer-readable storage media 852 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 852 may provide storage of computer-readable instructions, data structures, program modules, and other data for computing system 802.

In certain embodiments, storage subsystem 868 may also include a computer-readable storage media reader 850 that may further be connected to computer-readable storage media 852. Together and, optionally, in combination with system memory 860, computer-readable storage media 852 may comprehensively represent remote, local, fixed, and/or removable storage devices plus storage media for storing computer-readable information.

In certain embodiments, computing system 802 may provide support for executing one or more virtual machines. Computing system 802 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 802. Accordingly, multiple operating systems may potentially be run concurrently by computing system 802. Each virtual machine generally runs independently of the other virtual machines.

Communication subsystem 840 provides an interface to other computer systems and networks. Communication subsystem 840 serves as an interface for receiving data from and transmitting data to other systems from computing system 802. For example, communication subsystem 840 may enable computing system 802 to establish a communication channel to one or more client computing devices via the Internet for receiving and sending information from and to the client computing devices.

Communication subsystem 840 may support both wired and/or wireless communication protocols. For example, in certain embodiments, communication subsystem 840 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 840 may provide wired network connectivity (e.g., Ethernet) in addition to or instead of a wireless interface.

Communication subsystem 840 may receive and transmit data in various forms. For example, in some embodiments, communication subsystem 840 may receive input communication in the form of structured and/or unstructured data feeds, event streams, event updates, and the like. For example, communication subsystem 840 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 840 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 840 may also be configured to output the structured and/or unstructured data feeds, event streams, event updates, and the like to one or more databases that may be in communication with one or more streaming data source computers coupled to computing system 802.

Communication subsystem 840 may provide a communication interface 842, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., WiFi, IEEE 802.11 standards).

Computing system 802 may operate in response to requests received via communication interface 842. Further, in some embodiments, communication interface 842 may connect computing systems 802 to each other, providing scalable systems capable of managing high volumes of activity. Conventional or other techniques for managing server systems and server farms (collections of server systems that cooperate) may be used, including dynamic resource allocation and reallocation.

Computing system 802 may interact with various user owned or user operated devices via a wide area network such as the Internet. An example of a user operated device is shown in FIG. 8 as client computing system 802. Client computing system 804 may be implemented, for example, as a consumer device such as a smart phone, other mobile phone, tablet computer, wearable computing device (e.g., smart watch, eyeglasses), desktop computer, laptop computer, and so on.

For example, client computing system 804 may communicate with computing system 802 via communication interface 842. Client computing system 804 may include conventional computer components such as processing unit(s) 882, storage device 884, network interface 880, user input device 886, and user output device 888. Client computing system 804 also includes a Hardware Security Module (HSM) 889, which can include the TPMs described above. Client computing system 804 may be a computing device implemented in a variety of form factors, such as a desktop computer, laptop computer, tablet computer, smart phone, other mobile computing device, wearable computing device, or the like.

Processing unit(s) 882 and storage device 884 may be similar to processing unit(s) 812, 814 and local storage 822, 824 described above. Suitable devices may be selected based on the demands to be placed on client computing system 804; for example, client computing system 804 may be implemented as a "thin" client with limited processing capability or as a high-powered computing device. Client computing system 804 may be provisioned with program code executable by processing unit(s) 882 to enable various interactions with computing system 802 of a message management service such as accessing messages, performing actions on messages, and other interactions described above. Some client computing systems 804 may also interact with a messaging service independently of the message management service.

Network interface 880 may provide a connection to a wide area network (e.g., the Internet) to which communication interface 840 of computing system 802 is also connected. In various embodiments, network interface 880 may include a wired interface (e.g., Ethernet) and/or a wireless interface implementing various RF data communication standards such as WiFi, Bluetooth®, or cellular data network standards (e.g., 3G, 4G, LTE, etc.).

User input device 886 may include any device (or devices) via which a user may provide signals to client computing system 804; client computing system 804 may interpret the signals as indicative of particular user requests or information. In various embodiments, user input device 886 may include any or all of a keyboard, touch pad, touch screen, mouse or other pointing device, scroll wheel, click wheel, dial, button, switch, keypad, microphone, and so on.

User output device 888 may include any device via which client computing system 804 may provide information to a user. For example, user output device 888 may include a display to display images generated by or delivered to client computing system 804. The display may incorporate various image generation technologies, e.g., a liquid crystal display (LCD), light emitting diode (LED) including organic light emitting diodes (OLED), projection system, cathode ray tube (CRT), or the like, together with supporting electronics (e.g., digital to analog or analog to digital converters, signal processors, or the like). Some embodiments may include a device such as a touchscreen that function as both input and output device. In some embodiments, other user output devices 888 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher level code that are executed by a computer, an electronic component, or a microprocessor using an interpreter. Through suitable programming, processing unit(s) 812, 814 and 882 may provide various functionality for computing system 802 and client computing system 804, including any of the functionality described herein as being performed by a server or client, or other functionality associated with message management services.

It will be appreciated that computing system 802 and client computing system 804 are illustrative and that variations and modifications are possible. Computer systems used in connection with embodiments of the present invention may have other capabilities not specifically described here. Further, while computing system 802 and client computing system 804 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer readable storage medium).

Thus, although the invention has been described with respect to specific embodiments, it will be appreciated that the invention is intended to cover all modifications and equivalents within the scope of the following claims.

What is claimed:

1. A method for duplicating a user private key from a first user device to a second user device, comprising:
    installing a duplication application on the first user device;
    registering the user and a first user device with a Duplication Service server;
    Duplication Service associating the first user device with a policy that allows duplication to additional user devices conditioned upon provision of a user secret to the additional user devices;
    sending, by the Duplication Service server, a blob with the policy to the duplication application on the first user device;
    sending, by the duplication application, a create key command to an authenticator on the first user device;
    creating the user private key by the authenticator on the first user device;
    receiving, at the Duplication Service server, a duplication request from the first user device;
    sending a duplication command, from the Duplication Service, through the duplication application, to the authenticator on the first user device;
    encrypting the user private key in the authenticator on the first user device;
    sending the encrypted user private key from the authenticator on the first user device, through the duplication application, to the Duplication Service server; and
    downloading the user private key from the Duplication Service server to a second duplication application on a second user device, and sending the encrypted user private key to an authenticator on the second user device.

2. The method of claim 1 wherein the blob conforms to a Trusted Platform Module (TPM) template.

3. The method of claim 1 wherein the authenticator is a Trusted Platform Module (TPM).

4. The method of claim 1 further comprising protecting the user private key sent to the Duplication Service server with a user secret unknown to the Duplication Service server.

5. The method of claim 4 further comprising receiving the user secret from the user at the second user device for decrypting the user private key.

6. The method of claim 1 wherein the policy includes:
    a public key corresponding to a private key of the Duplication Service server; and
    a provision for a user secret to encrypt the user private key.

7. The method of claim 1 further comprising:
    maintaining an audit file with a log of commands and parameters involved in duplication of the user private key.

8. The method of claim 1 wherein the Duplication Service server creates and maintains the policy for the user that restricts the duplication of the user private key to destination user devices provided by the user.

9. The method of claim 1 further comprising:
    verifying that the authenticators on the first and second user devices are authorized by the user and a relying party; and
    maintaining a list of approved authenticators at the Duplication Service server.

10. The method of claim 9 wherein the relying party is verified using an existing login to the relying party.

11. A method for duplicating a user private key from a first user device to a second user device, comprising:
    installing a duplication application on the first user device;
    registering the user and a first user device with a Duplication Service server;
    associating the user device with a policy that allows duplication to additional user devices conditioned upon provision of the user secret to the additional user devices;
    sending, by the Duplication Service server, a blob with the policy to the duplication application on the first user device, wherein the blob conforms to a Trusted Platform Module (TPM) template;
    sending, by the duplication application, a create key command to an authenticator on the first user device, wherein the authenticator is a Trusted Platform Module (TPM);
    creating the user private key by the authenticator on the first user device;
    protecting the user private key with a user secret unknown to the Duplication Service server;
    receiving, at the Duplication Service server, a duplication request from the first user device;
    sending a duplication command, from the Duplication Service, through the duplication application, to the authenticator on the first user device;

encrypting the user private key in the authenticator on the first user device;

sending the encrypted user private key from the authenticator on the first user device, through the duplication application, to the Duplication Service server;

downloading the user private key from the Duplication Service server to a second duplication application on a second user device;

sending the encrypted user private key to an authenticator on the second user device; and receiving the user secret from the user at the second user device for decrypting the user private key.

12. The method of claim 11 further comprising:

maintaining an audit file with a log of commands and parameters involved in duplication of the user private key.

13. The method of claim 11 wherein the Duplication Service server creates and maintains the policy for the user that restricts the duplication of the user private key to destination user devices provided by the user.

14. The method of claim 11 further comprising:

verifying that the authenticators on the first and second user devices are authorized by the user and a relying party; and maintaining a list of approved authenticators at the Duplication Service server.

15. A system comprising:

One or more computing devices including one or more processors and non-transitory computer readable mediums having stored thereon software instructions that, when executed by the processor, cause the one or more processors to execute the steps comprising:

installing a duplication application on a first user device;

registering the user and a first user device with a Duplication Service server;

associating the user device with a policy that allows duplication to additional user devices conditioned upon provision of the user secret to the additional user devices;

sending, by the Duplication Service server, a blob with the policy to the duplication application on the first user device;

sending, by the duplication application, a create key command to an authenticator on the first user device;

creating a user private key by the authenticator on the first user device;

receiving, at the Duplication Service server, a duplication request from the first user device;

sending a duplication command, from the Duplication Service, through the duplication application, to the authenticator on the first user device;

encrypting the user private key in the authenticator on the first user device;

sending the encrypted user private key from the authenticator on the first user device, through the duplication application, to the Duplication Service server; and downloading the user private key from the Duplication Service server to a second duplication application on a second user device, and sending the encrypted user private key to an authenticator on the second user device.

16. The system of claim 15 wherein the one or more non-transitory computer readable mediums have stored thereon software instructions that, when executed by the processor, cause the one or more processors to execute the steps comprising:

protecting the user private key sent to the Duplication Service with a user secret unknown to the Duplication Service.

17. The system of claim 15 wherein the one or more non-transitory computer readable mediums have stored thereon software instructions that, when executed by the processor, cause the one or more processors to execute the steps comprising:

protecting the user private key sent to the Duplication Service with a user secret unknown to the Duplication Service.

18. The system of claim 15 wherein the one or more non-transitory computer readable mediums have stored thereon software instructions that, when executed by the processor, cause the one or more processors to execute the steps comprising:

maintaining an audit file with a log of commands and parameters involved in duplication of the user private key.

19. The system of claim 15 wherein the one or more non-transitory computer readable mediums have stored thereon software instructions that, when executed by the processor, cause the one or more processors to execute the steps comprising:

verifying that the authenticators on the first and second user devices are authorized by the user and a relying party; and maintaining a list of approved authenticators at the Duplication Service server.

20. The system of claim 15 wherein the blob conforms to a Trusted Platform Module (TPM) template.

* * * * *